(12) United States Patent
Kinoshita et al.

(10) Patent No.: US 9,540,062 B2
(45) Date of Patent: *Jan. 10, 2017

(54) MOTORCYCLE

(71) Applicant: HONDA MOTOR CO., LTD., Tokyo (JP)

(72) Inventors: Nobuaki Kinoshita, Wako (JP); Yusuke Takaishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,616

(22) Filed: Jan. 14, 2015

(65) Prior Publication Data
US 2015/0203164 A1 Jul. 23, 2015

(30) Foreign Application Priority Data
Jan. 20, 2014 (JP) .................................. 2014-007569

(51) Int. Cl.
| G05D 1/00 | (2006.01) |
| G05D 3/00 | (2006.01) |
| G06F 7/00 | (2006.01) |
| G06F 17/00 | (2006.01) |
| B62H 5/00 | (2006.01) |

(Continued)

(52) U.S. Cl.
CPC .................. *B62H 5/00* (2013.01); *B60R 25/24* (2013.01); *B62H 5/20* (2013.01); *B62K 2202/00* (2013.01)

(58) Field of Classification Search
CPC .... B60R 2325/304; B60R 25/04; B60R 25/24; B60R 25/02; B60R 25/10; B60R 16/0232; B60R 16/0239; B60R 25/0215; B60R 25/02153;B60R 25/1004; B60R 25/2063; B62H 1/12; B62H 5/20; B62H 1/00; B62H 5/00; B62H 5/18; B62H 5/08; B62K 25/283; B62K 11/04; B62K 19/30; B62K 11/02; B62K 11/10; B62K 11/14; B62K 19/34; B62K 2025/044
USPC ...... 701/1, 36, 102, 103, 51, 70, 82, 85, 22; 280/291, 835, 280, 202, 239, 293, 280/124.109, 288.4
See application file for complete search history.

(56) References Cited

U.S. PATENT DOCUMENTS

| 4,181,190 A | * | 1/1980 | Yang ........................ | B62H 1/12 180/219 |
| 5,596,317 A | * | 1/1997 | Brinkmeyer ............ | B60R 25/24 180/287 |

(Continued)

FOREIGN PATENT DOCUMENTS

JP 2007-276634 A 10/2007

*Primary Examiner* — Calvin Cheung
*Assistant Examiner* — Luis A Martinez Borrero
(74) *Attorney, Agent, or Firm* — Squire Patton Boggs (US) LLP

(57) ABSTRACT

A motorcycle includes a vehicle-side control unit that determines whether or not identification information from an electronic key conforms to identification information on a side of a vehicle. An ignition switch unit allows at least starting operation of an engine and unlocking operation of a handlebar, in accordance with a situation where the identification information from the electronic key conforms to the identification information on the side of the vehicle. The vehicle-side control unit and the ignition switch unit are disposed on one side of a head pipe of the vehicle. The vehicle-side control unit is disposed in the vicinity of the head pipe, and below the ignition switch unit.

10 Claims, 14 Drawing Sheets

(51) Int. Cl.
*B60R 25/24* (2013.01)
*B62H 5/20* (2006.01)

(56) References Cited

U.S. PATENT DOCUMENTS

| | | | | |
|---|---|---|---|---|
| 5,808,372 A * | 9/1998 | Schwegler | | B60R 25/04 307/10.4 |
| 5,886,421 A * | 3/1999 | Mizuno | | B60R 25/00 180/287 |
| 6,028,507 A * | 2/2000 | Banks | | B60R 25/04 307/10.3 |
| 6,359,547 B1 * | 3/2002 | Denison | | B60R 25/102 340/5.73 |
| 6,496,100 B1 * | 12/2002 | Hiebl | | B60R 25/24 307/10.3 |
| 6,948,472 B2 * | 9/2005 | Suzuki | | B60R 25/04 123/195 E |
| 7,438,340 B2 * | 10/2008 | Kurihara | | B62J 17/06 296/37.1 |
| 7,614,471 B2 * | 11/2009 | Shimizu | | B62J 17/02 180/219 |
| 7,730,752 B2 * | 6/2010 | Yoshitake | | B60R 25/04 307/10.3 |
| 8,040,225 B2 * | 10/2011 | Nakamura | | B60R 25/24 340/426.13 |
| 8,423,203 B2 * | 4/2013 | Takeuchi | | B60R 25/24 701/2 |
| 8,628,103 B2 * | 1/2014 | Kawai | | B62J 99/00 180/219 |
| 8,657,049 B2 * | 2/2014 | Katsuno | | B62J 99/00 174/72 A |
| 8,799,657 B2 * | 8/2014 | Bhattacharya | | G07C 9/00174 307/10.3 |
| 8,973,696 B2 * | 3/2015 | Hamauzu | | B60T 8/3225 180/219 |
| 9,145,109 B2 * | 9/2015 | Kinoshita | | B60R 25/04 |
| 2003/0079926 A1 * | 5/2003 | Taniguchi | | B62K 11/04 180/219 |
| 2004/0090306 A1 * | 5/2004 | Konno | | B60R 25/02153 340/5.62 |
| 2004/0093127 A1 * | 5/2004 | Onoyama | | B60R 25/00 701/1 |
| 2005/0155804 A1 * | 7/2005 | Kamemizu | | B62J 7/04 180/219 |
| 2005/0242929 A1 * | 11/2005 | Onishi | | B60R 25/04 340/426.17 |
| 2006/0038657 A1 * | 2/2006 | Denison | | B60R 25/102 340/5.73 |
| 2007/0247280 A1 * | 10/2007 | Nakamura | | B60R 25/24 340/5.72 |
| 2007/0285272 A1 * | 12/2007 | Umeda | | B60R 25/24 340/5.31 |
| 2010/0032225 A1 * | 2/2010 | Oohashi | | B62K 19/30 180/219 |
| 2011/0162885 A1 * | 7/2011 | Yamaguchi | | B60R 16/0215 174/72 A |
| 2011/0285521 A1 * | 11/2011 | Ramirez | | B60R 25/00 340/426.1 |
| 2015/0203071 A1 * | 7/2015 | Kinoshita | | B60R 25/04 180/287 |

* cited by examiner

FIG. 7
FRONT FACE
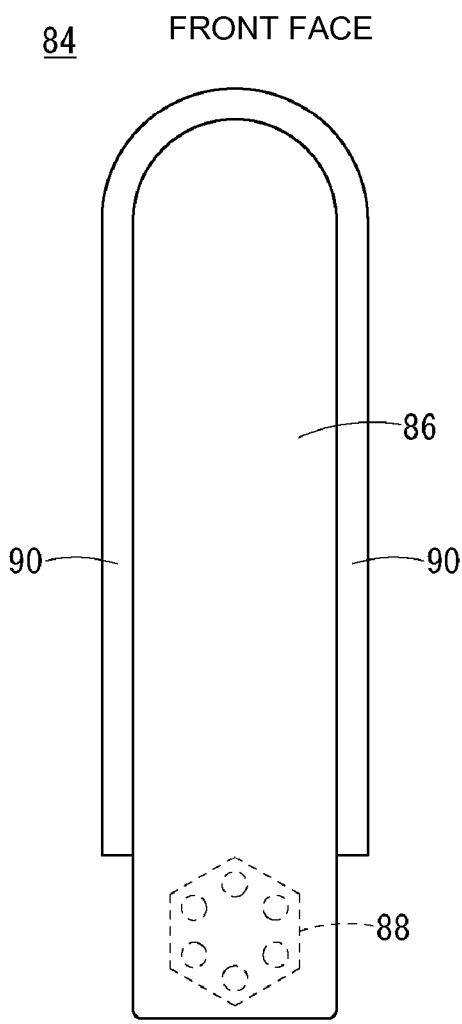
LATERAL FACE
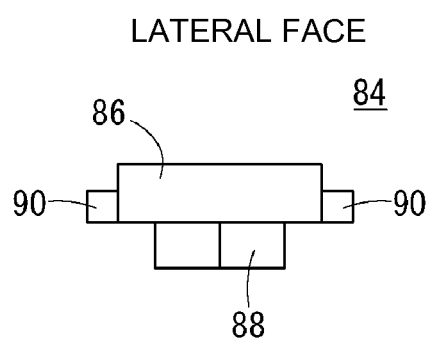

FIG. 8
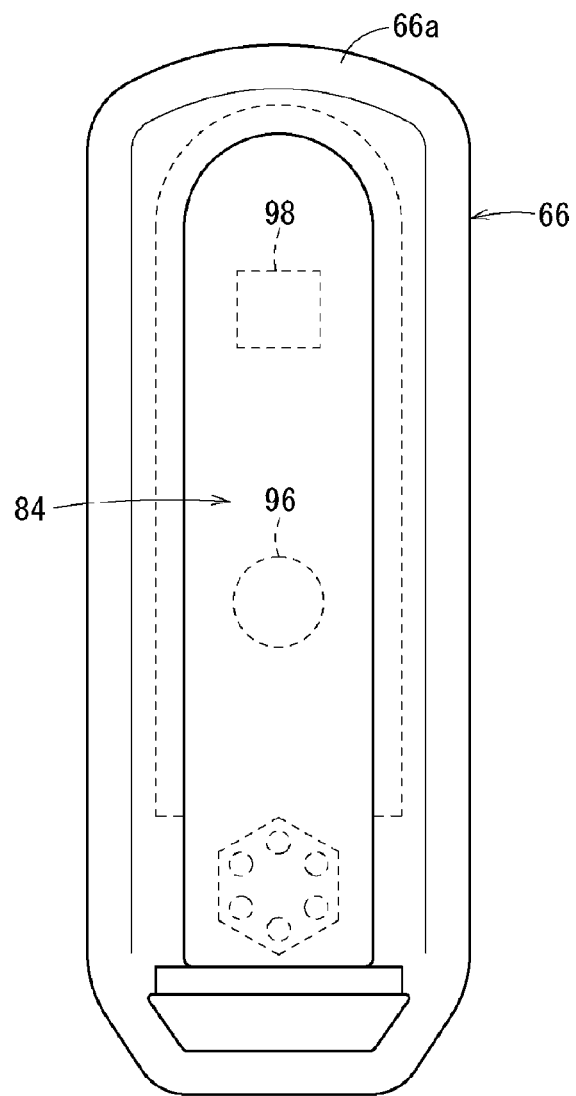
FRONT FACE
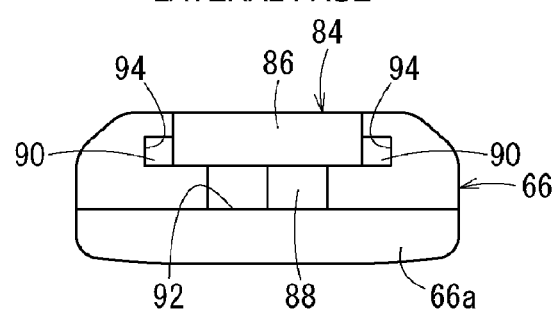
LATERAL FACE

MOTORCYCLE

BACKGROUND

Field

The present invention relates to a motorcycle including an electronic authentication system.

Description of the Related Art

As disclosed in Patent Literature 1 (JP-A No. 2007-276634), an electronic authentication system has been widely known. The known electronic authentication system is configured to allow operation of a vehicle when ID information transmitted from a portable electronic key is right.

However, in Patent Literature 1, an ignition switch unit and a vehicle-side control unit are arranged to sandwich a head pipe therebetween. As a result, wiring therebetween is lengthened, and also efficiency in layout of the whole electronic authentication system is deteriorated.

SUMMARY

In view of the above-mentioned circumstances, an object of the present invention is to provide a motorcycle configured such that the wiring between the ignition switch unit and the vehicle-side control unit is shortened, and also the efficiency in the layout of the whole electronic authentication system is improved.

In certain embodiments, a motorcycle includes a vehicle-side control unit that determines whether or not identification information from an electronic key conforms to identification information on a side of a vehicle. An ignition switch unit allows at least starting operation of an engine and unlocking operation of a handlebar, in accordance with a situation where the identification information from the electronic key conforms to the identification information on the side of the vehicle. The vehicle-side control unit and the ignition switch unit are arranged on one side of a head pipe of the vehicle. The vehicle-side control unit is arranged in the vicinity of the head pipe and below the ignition switch unit.

In certain embodiments, the vehicle-side control unit is arranged with a longitudinal direction thereof directed to a front-back direction of the vehicle.

In certain embodiments, an inner box is arranged on the other side of the head pipe where the vehicle-side control unit and the ignition switch unit are not arranged.

In certain embodiments, a protective cover for covering one vertical side of the vehicle-side control unit is fixed to the head pipe.

In certain embodiments, a vehicle body cover of the vehicle is provided with a projecting portion that extends to cover the other vertical side of the vehicle-side control unit, and that prevents detachment of the vehicle-side control unit.

Since the vehicle-side control unit is arranged in the vicinity of the head pipe, access to the vehicle-side control unit becomes difficult. Also, the vehicle-side control unit and the ignition switch unit are arranged on the one side of the head pipe of the vehicle, and the vehicle-side control unit is arranged below the ignition switch unit. For this reason, wiring for connecting the vehicle-side control unit and the ignition switch unit can be shortened. Also, the vehicle-side control unit and the ignition switch unit can be collectively arranged, and efficiency in layout of the whole electronic authentication system is improved.

The longitudinal direction of the vehicle-side control unit is directed to the front-back direction of the vehicle, in some embodiments. For this reason, the vehicle-side control unit can approach the head pipe.

In some embodiments, the vehicle-side control unit and the ignition switch unit are collectively arranged on the one side of the head pipe. For this reason, a storage space for the inner box can be ensured on the other side of the head pipe.

In some embodiments, the vehicle-side control unit is arranged in the vicinity of the head pipe. For this reason, the protective cover for covering the one vertical side of the vehicle-side control unit is easily attached to the head pipe, and the vehicle-side control unit can be protected.

In some embodiments, the projecting portion is integrally provided to the vehicle body cover. For this reason, the vehicle-side control unit can be protected while reducing the number of components.

BRIEF DESCRIPTION OF DRAWINGS

FIG. 7 is a view for indicating a front face and a lateral face of an emergency release key.

FIG. 8 is a view for indicating a front face and a lateral face of an electronic key with the emergency release key stored therein.

DETAILED DESCRIPTION

A motorcycle according to embodiments of the present invention will be detailedly described below with reference to the accompanying drawings.

Figure 1:
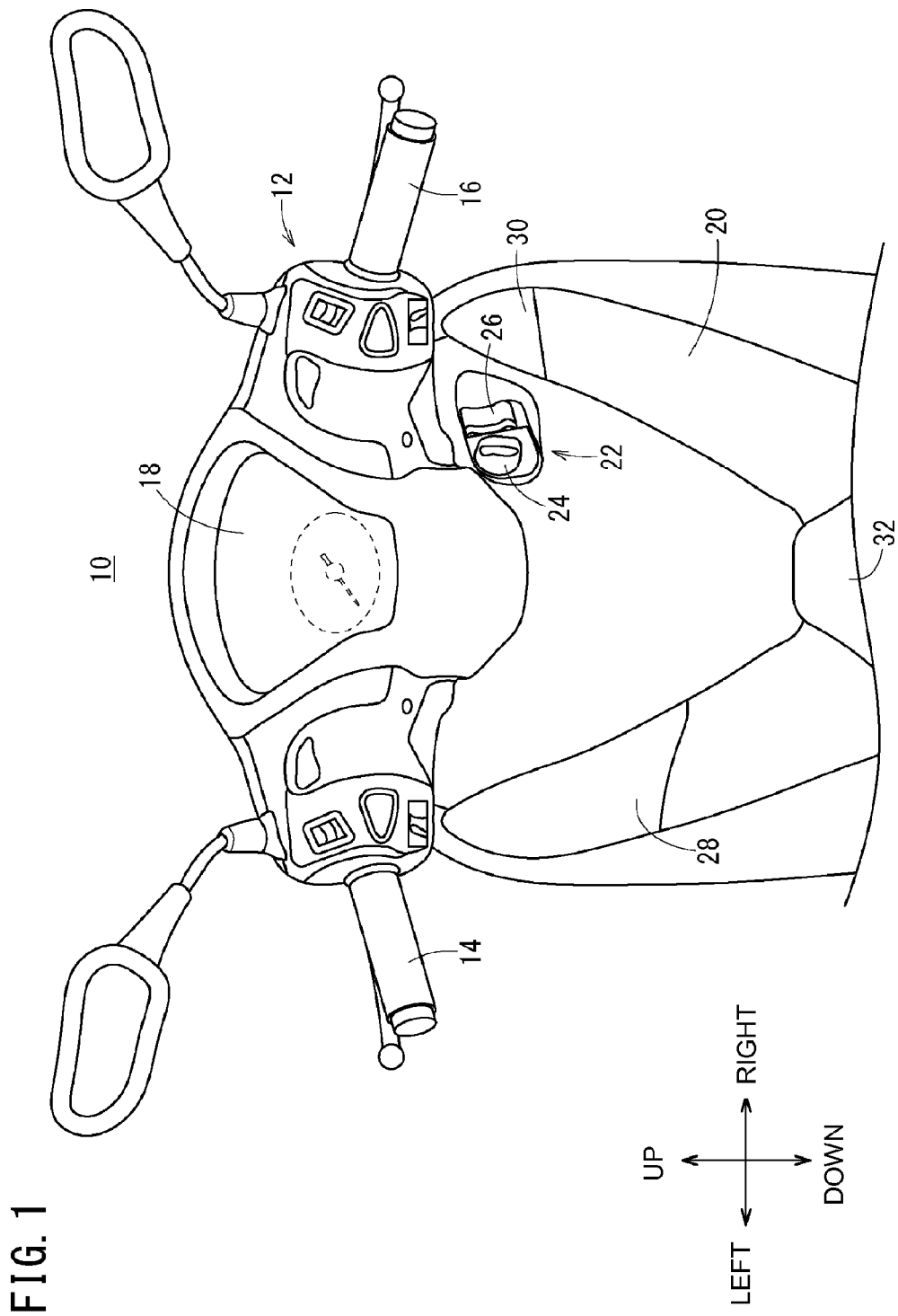
FIG. 1 is a partially enlarged view in the vicinity of a handlebar portion of a scooter motorcycle.

FIG. 1 is a partially enlarged view in the vicinity of a handlebar portion 12 of a scooter motorcycle (vehicle) 10. Note that in the embodiments, unless otherwise specially indicated, right and left, and upper and lower directions will be explained in accordance with arrows in FIG. 1, and also a front-back direction will be explained with a traveling direction of the motorcycle 10 as a frontward direction.

The handlebar portion 12 has a left grip 14 arranged at a left end, a right grip 16 arranged at a right end, and a meter unit 18 arranged in the center between the left grip 14 and the right grip 16. The meter unit 18 indicates a vehicle speed or the like. An ignition knob 24 and a lid opening knob 26 of a smartlock module 22 are provided on an upper right side of a resin leg shield 20 as a vehicle body cover provided below the handlebar portion 12. An openable and closable cover 28 for an inner box 118 (see FIG. 9) is attached to a left side of the leg shield 20. When the cover 28 is opened to a near side, the inner box 118 for storing goods appears. An attachable and detachable emergency releasing cover 30 is provided on the upper right side of the leg shield 20 and on a right side of the lid opening knob 26. When the emergency releasing cover 30 is detached, an emergency releasing key cylinder 82 (see FIG. 3) described later appears. The cover 28 and the emergency releasing cover 30 are formed of resin. That is, the leg shield 20, the cover 28, and the emergency releasing cover 30 are formed of resin. In view of this, opening and closing of the cover 28, and detachment of the emergency releasing cover 30 are easily performed.

The ignition knob 24 is an operation element for switching on, off, or the like an ignition switch (power supply switch). When the ignition switch is switched on, an engine of the motorcycle 10 can be started. The lid opening knob 26 is an operation element for unlocking a fuel lid and a storage lid. The fuel lid is a cover for an unillustrated fuel tank of the motorcycle 10, and the storage lid is a cover for an unillustrated storage box of the vehicle. The storage box may be provided below a seat 32. In this case, the seat 32 may function as the storage lid. Hereinafter, the smartlock module 22 will be detailedly described.

Figure 2:
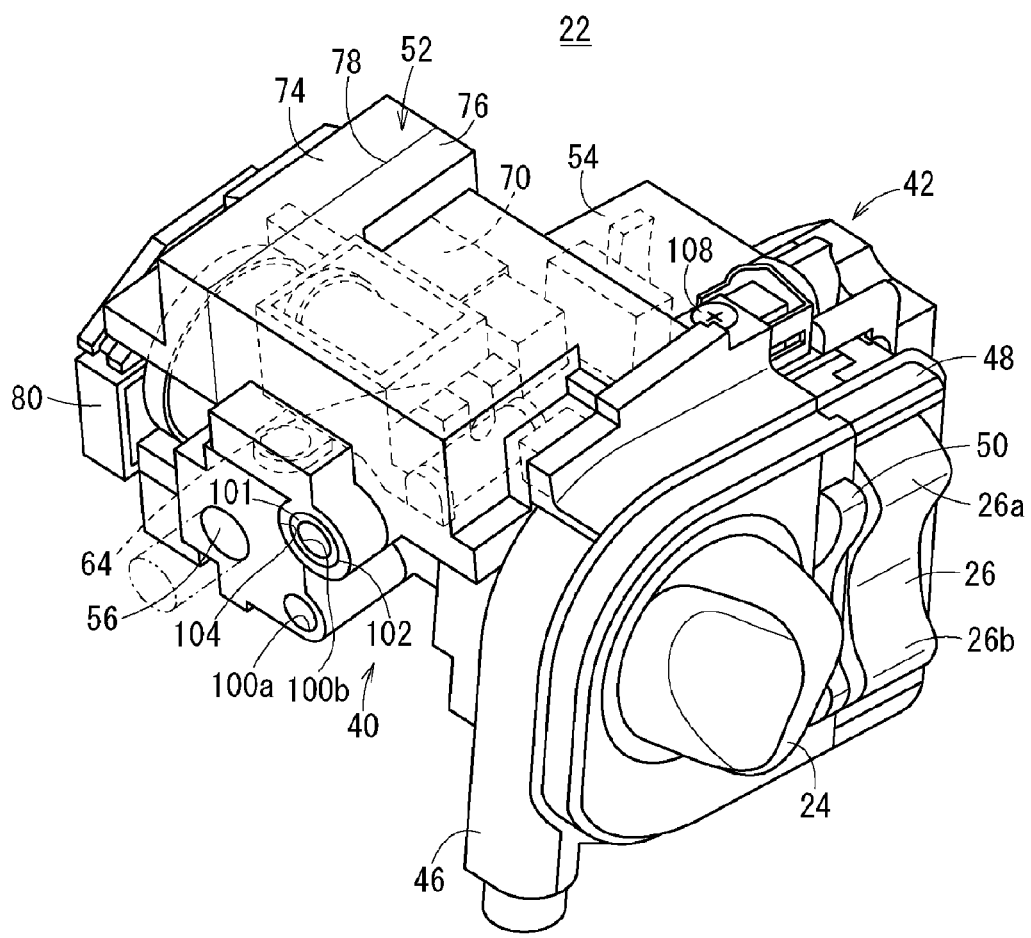
FIG. 2 is a rear perspective view of a smartlock module.
Figure 3:
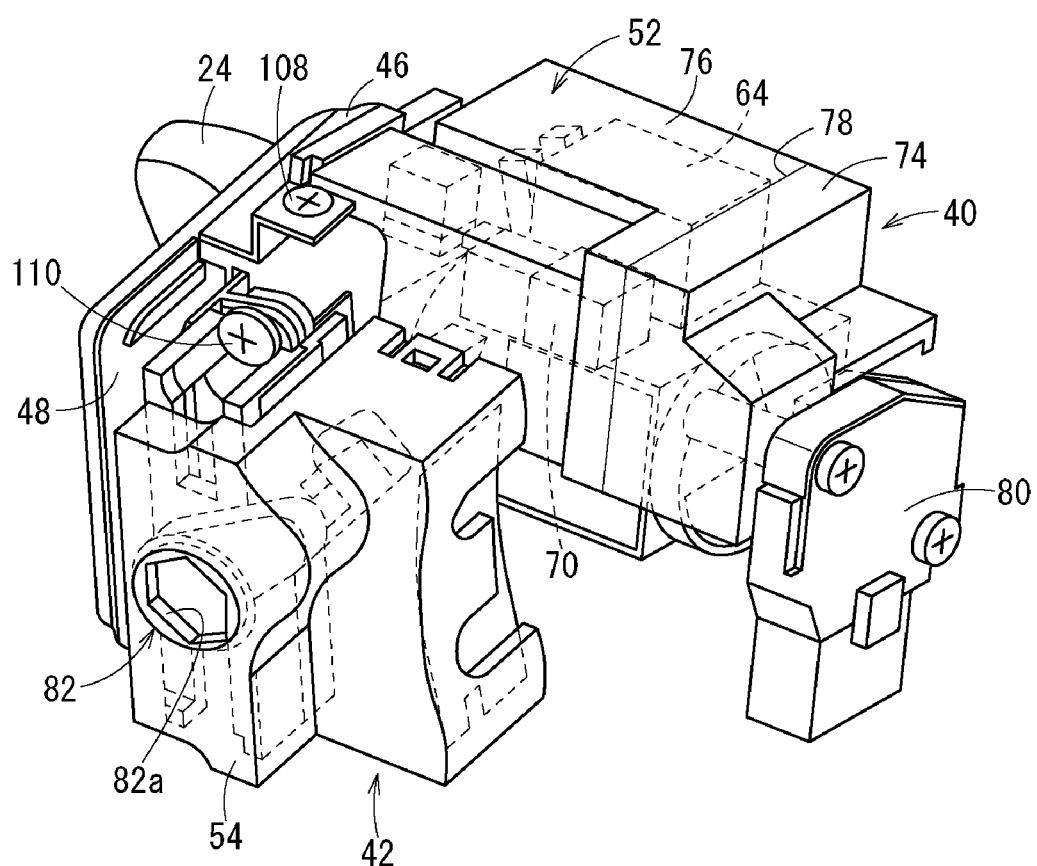
FIG. 3 is a front perspective view of the smartlock module.
Figure 4:
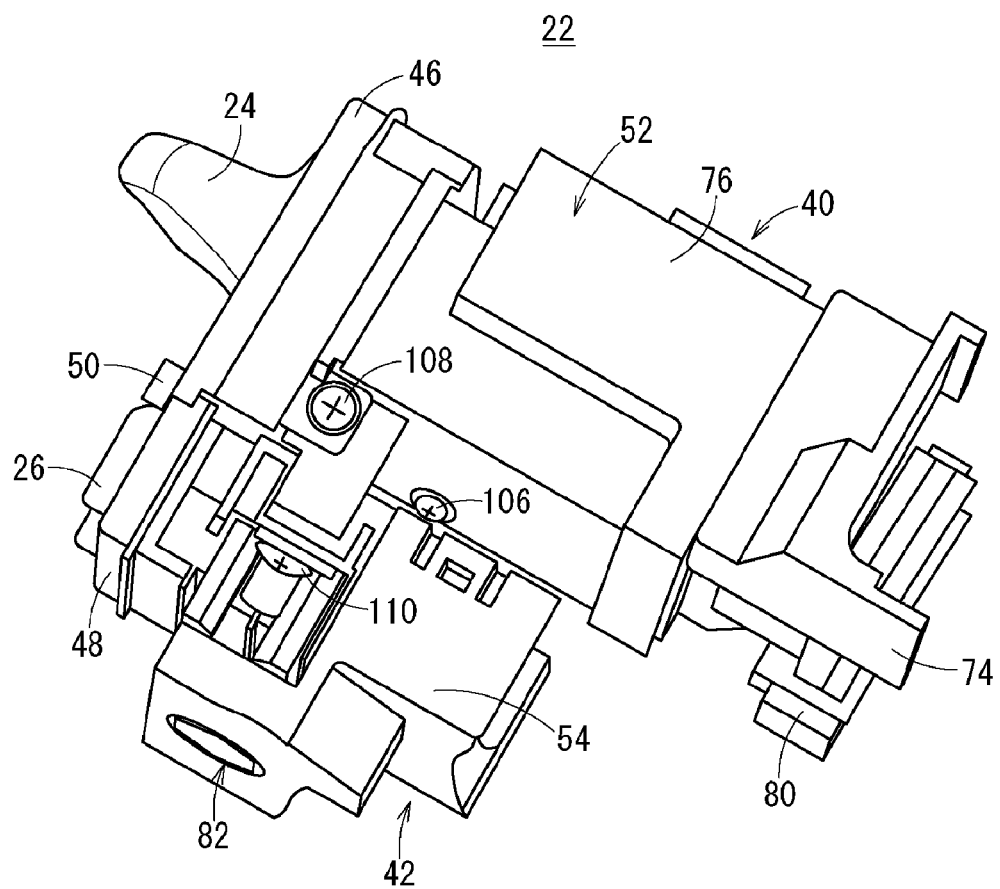
FIG. 4 is an upper perspective view of the smartlock module.
Figure 5:
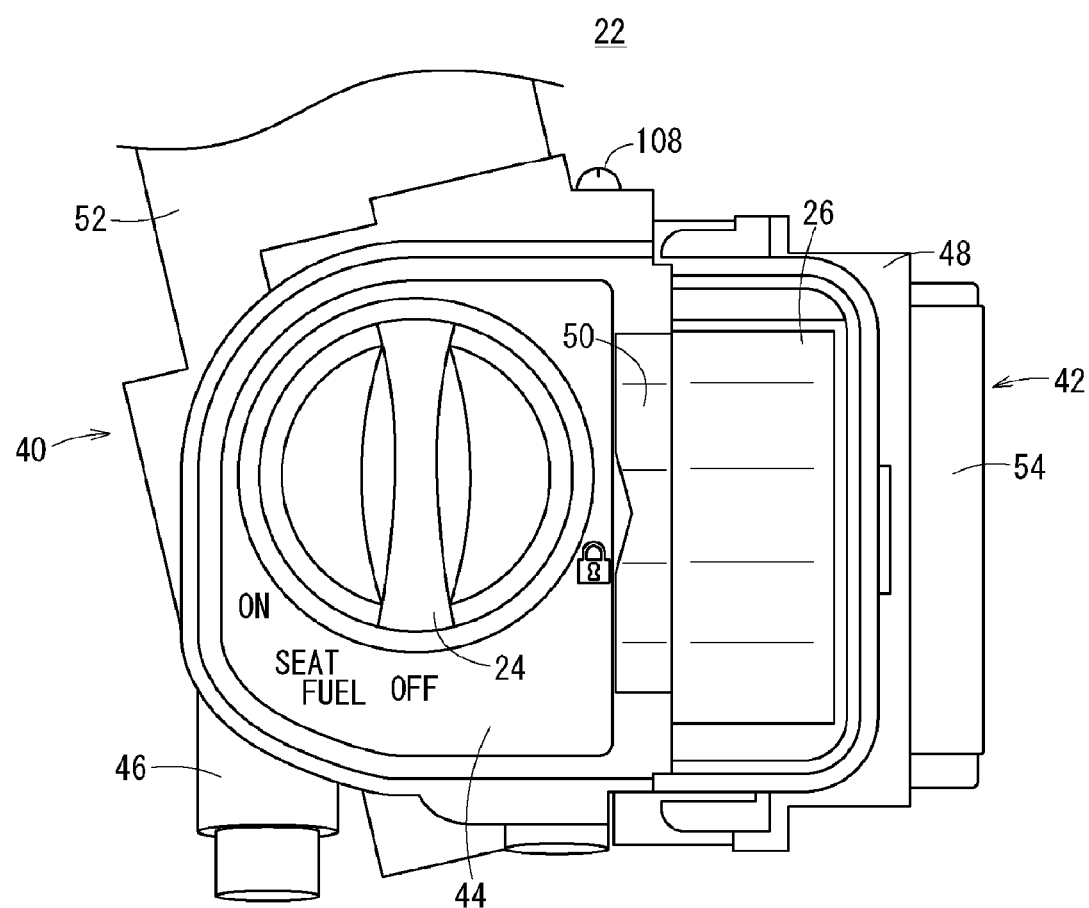
FIG. 5 is a partial front view of the smartlock module.

FIG. 2 is a rear perspective view of the smartlock module 22, FIG. 3 is a front perspective view of the smartlock module 22, FIG. 4 is an upper perspective view of the smartlock module 22, and FIG. 5 is a partial front view of the smartlock module 22.

The smartlock module 22 has an ignition switch unit 40 that switches on and/or off the ignition switch according to turning operation of the ignition knob 24, and a lid release unit 42 that unlocks the fuel lid and the storage lid according to operation of the lid opening knob 26.

The ignition knob 24 is provided on a front face of the ignition switch unit 40 (provided backward of the vehicle body). When the ignition knob 24 is turned, the ignition switch unit 40 switches on/off the ignition switch and switches locking/unlocking of the handlebar. Also, when the ignition knob 24 is turned, the lid opening knob 26 is brought to an operable state by the ignition switch unit 40. As shown in FIG. 5, a decorative panel 44 printed with letters, that is, "ON", "SEAT FUEL", and "OFF", and a key icon, is provided around the ignition knob 24. The decorative panel 44 and the ignition switch unit 40 are supported by a first case 46.

The seesaw lid opening knob 26 is provided on a front face of the lid release unit 42 (provided behind the vehicle body). The lid release unit 42 is supported by a second case 48 provided on a right side of the vehicle body with respect to the first case 46. By the first case 46 and the second case 48, the lid opening knob 26 and the lid release unit 42 are arranged adjacently to each other on the right side of the vehicle body with respect to the ignition knob 24 and the ignition switch unit 40.

As shown in FIG. 2, a curved projection portion 50 conforming to a shape of the lid opening knob 26 is provided in a position on the first case 46 and in close proximity to the lid opening knob 26 so that fingers including a thumb are prevented from being involuntarily brought into contact with the lid opening knob 26 when operating the ignition knob 24. The ignition switch unit 40 is covered with a first protective cover (resin cover) 52, and the lid release unit 42 is covered with a second protective cover (resin cover) 54. The first protective cover 52 and the second protective cover 54 are formed of hard resin or the like. For this reason, a reduction in weight and cost of the first protective cover 52 and the second protective cover 54 can be achieved.

As shown in FIG. 5, turning positions of the ignition knob 24 have four positions, that is, "ON", "SEAT FUEL", "OFF", and "LOCK" (key icon). When the turning position of the ignition knob 24 is set to "ON", the ignition switch unit 40 switches on the ignition switch. When the turning position of the ignition knob 24 is set to "OFF", the ignition switch unit 40 switches off the ignition switch. When the turning position of the ignition knob 24 is set to "SEAT FUEL", the lid opening knob 26 is brought to the operable state by the ignition switch unit 40. For this reason, with the turning position of the ignition knob 24 set to "SETA FUEL", an upper portion 26a and a lower portion 26b (see FIG. 2) of the lid opening knob 26 can be push-pressed. When the upper portion 26a of the lid opening knob 26 is push-pressed, the lid release unit 42 unlocks the fuel lid and the storage lid. When the lower portion 26b of the lid opening knob 26 is push-pressed, the lid release unit 42 unlocks the storage lid. By such unlocking, the fuel lid and the storage lid can be opened.

When the turning position of the ignition knob 24 is set to "LOCK" (key icon), in the ignition switch unit 40, a handlebar locking pin 56 (see FIG. 2) provided on a left side is projected leftward (outward). Note that, in FIG. 2, the projecting handlebar locking pin 56 is drawn by dashed lines. The projecting handlebar locking pin 56 is inserted into an engagement hole (drawing is omitted) formed in a steering stem 58 (see FIG. 9) composing a vehicle body frame turned by steering a handlebar of the vehicle. With this arrangement, the handlebar can be locked. The steering stem 58 is rotatably journaled by the head pipe 60 (see FIG. 9) composing the vehicle body frame.

As shown in FIG. 2 and FIG. 3, a lock mechanism 64 using a solenoid and restricting the turning of the ignition knob 24 is provided on an upper surface of the ignition switch unit 40. The lock mechanism 64 has a structure that allows the turning of the ignition knob 24 (that cancels a locked state) by disengaging a locking pin only when electric power from an unillustrated battery of the vehicle is distributed to the solenoid while the ignition knob 24 is made unturnable (made in a locked state) by engaging the locking pin (drawing is omitted) biased by a biasing member such as a spring.

Figure 9:
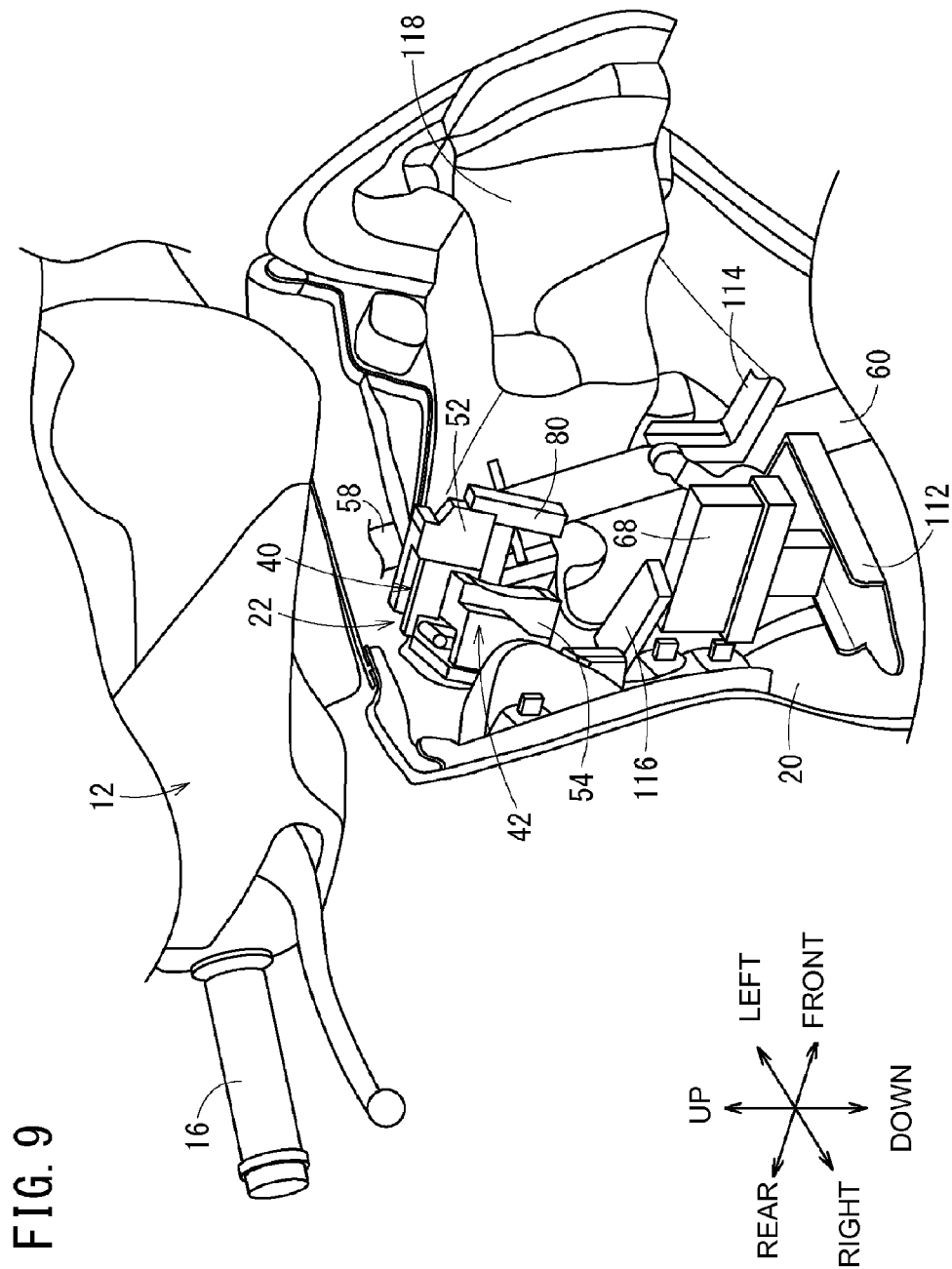
FIG. 9 is a view for explaining a relationship of arrangement when the smartlock module and a vehicle-side control unit are attached to the motorcycle.

When an electronic key 66 (see FIG. 8) is push-pressed as an initial operation for turning the ignition knob 24 by a rider having the electronic key 66, electronic authentication is conducted through radio communication between the electronic key 66 and a vehicle-side control unit 68 (see FIG. 9). As a result, the lock mechanism 64 is unlocked. For this reason, the turning operation of the ignition knob 24 and the operation of the lid opening knob 26 can be performed. Detailedly, when the ignition knob 24 is push-pressed as the initial operation, the electronic authentication is conducted. That is, the vehicle-side control unit 68 requires the electronic key 66 to output identification information (ID information), and according to this requirement, the electronic key 66 transmits the identification information stored in the electronic key 66 itself. The vehicle-side control unit 68 determines whether or not the identification information transmitted from the electronic key 66 conforms to the identification information on the side of the vehicle. Only when the identification information transmitted from the electronic key 66 conforms to the identification information on the side of the vehicle (only when the electronic authentication is conducted), the vehicle-side control unit 68 supplies a current to the solenoid and unlocks the lock mechanism 64 to enable the turning of the ignition knob 24. Note that when the identification information transmitted from the electronic key 66 does not conform to the identification information on the side of the vehicle, the vehicle-side control unit 68 locks the lock mechanism 64. Electronic authentication operation is performed when the ignition knob 24 is turned from the turning position of "LOCK", "OFF", or "SEAT FUEL" to the other turning position. An electronic authentication system is composed of the smartlock module 22 and the vehicle-side control unit 68.

As shown in FIG. 2 and FIG. 3, a coupler 70 is provided on the upper surface of the ignition switch unit 40 and next to the right side of the vehicle body with respect to the lock mechanism 64. In this way, the ignition switch unit 40, the lock mechanism 64, and the coupler 70 are integrally attached to be modularized. With this arrangement, the number of components can be reduced, and efficiency in assembly work of the smartlock module 22 is improved. The coupler 70 is electrically connected to the solenoid of the lock mechanism 64 through a conductor, and a coupler 72 (see FIG. 6) attached with wiring 72a for electrically connecting the vehicle-side control unit 68 and the solenoid can be connected to the coupler 70. In order to prevent access to the lock mechanism 64 and the coupler 70, the first protective cover 52 is attached to the ignition switch unit 40 so as to partially cover an upper side and a lateral side of the ignition switch unit 40.

Figure 6:
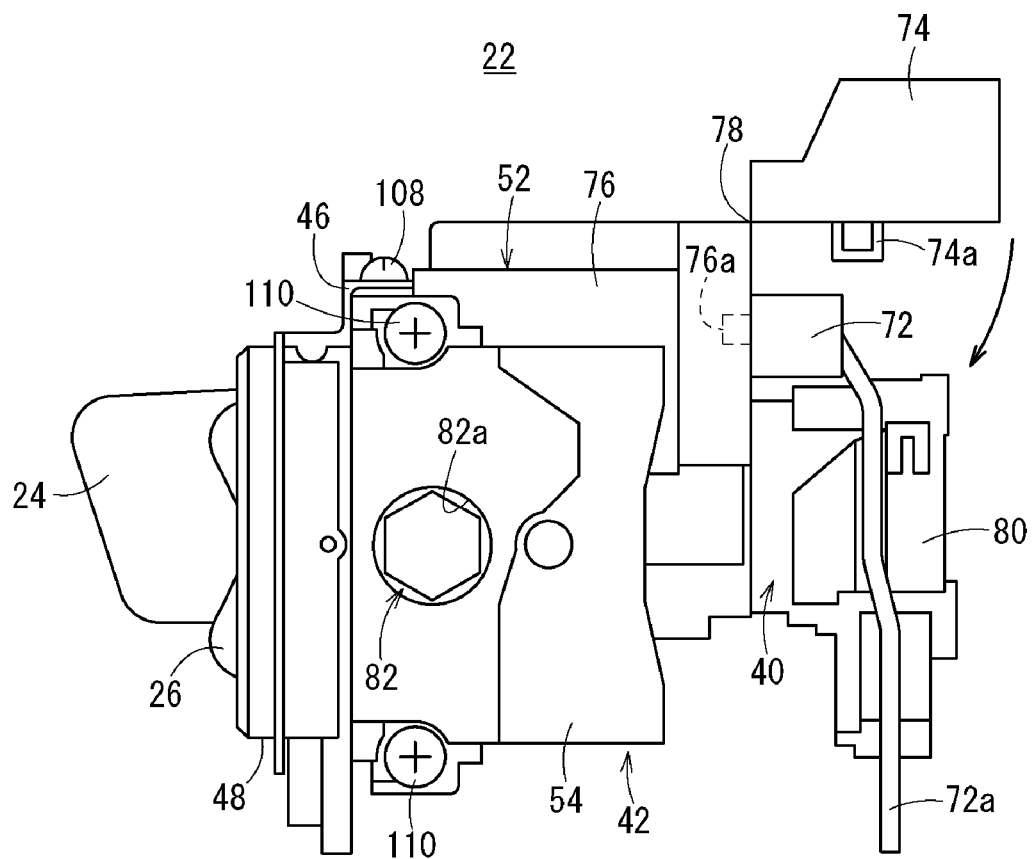
FIG. 6 is a view for explaining wiring connections to a coupler provided in a first protective cover.

As shown in FIG. 6, the first protective cover 52 is formed with a cover portion 74 configured to be openably and/or closably (bendably) by using elasticity of the resin. That is, the first protective cover 52 is composed of the cover portion 74 and a body portion 76, and the cover portion 74 and the body portion 76 are juncturally formed through a bent portion 78. A claw portion (engagement portion) 74a is provided on an inner side of the cover portion 74, and a locking portion (engagement portion) 76a engaged with the claw portion 74a when the cover portion 74 is closed is provided on an inner side of the body portion 76. By engagement of the claw portion 74a with the locking portion 76a, the cover portion 74 can be kept in a closed state. Also, since the claw portion 74a and the locking portion 76a are respectively provided on the inner sides of the cover portion 74 and the body portion 76, as shown in FIG. 2 and FIG. 3, the claw portion 74a and the locking portion 76a are not visually recognized from the outside when the cover portion 74 is closed. For this reason, access to the claw portion 74a and the locking portion 76a cannot be performed from the outside, and the cover portion 74 cannot be easily opened.

With the cover portion 74 opened, the couple 72 is connected to the coupler 70, and after that, the cover portion 74 is closed. With this arrangement, even after the first protective cover 52 is attached to the ignition switch unit 40, the coupler 72 can be connected to the coupler 70, and the lock mechanism 64 can be protected. Also, at a front end of the vehicle body, the ignition switch unit 40 is provided with a direct coupler 80 for performing electrical connection with a side of the motorcycle.

As shown in FIG. 3, the lid release unit 42 has an emergency releasing key cylinder 82 formed on the right side of the vehicle body. The key cylinder 82 is configured turnably by an emergency release key 84 (see FIG. 7) provided separately from the electronic key 66 for conducting the electronic authentication. When the key cylinder 82 is turned by the emergency release key 84, the lid release unit 42 unlocks the storage lid regardless of the operation of the lid opening knob 26. The key cylinder 82 has a keyhole 82a into which the emergency release key 84 is inserted, and the keyhole 82a is exposed from an opening formed in the second protective cover 54.

With this arrangement, even when the electronic authentication by the electronic key 66 cannot be conducted, the storage lid can be opened by turning the key cylinder 82 by the emergency release key 84. At this time, if the storage box below the storage lid is provided with a button or the like for canceling locking by the lock mechanism 64, the turning position of the ignition knob 24 can be set to "ON" without the electronic authentication by the electronic key 66. That is, by the emergency release key 84, the lid release unit 42 indirectly enables starting operation of the engine. In this way, the lid release unit 42 also functions as an emergency release mechanism. Note that the starting operation of the engine may be directly performed by employing a structure for canceling the locking by the lock mechanism 64 by operating the emergency release key 84.

FIG. 7 indicates a front face and a lateral face of the emergency release key 84. The emergency release key 84 has a rod-like grip portion 86 extending substantially linearly, and a magnet key 88 provided to a lateral on an end side of the grip portion 86. In the embodiment, the grip portion 86 is formed into a tabular shape, and the magnet key 88 is arranged on a tabular surface on the end side of the grip portion 86. The magnet key 88 has the same hexagonal shape as the keyhole 82a formed in the key cylinder 82. The magnet key 88 is inserted into the keyhole 82a formed in the key cylinder 82. The emergency release key 84 is inserted into and stored in the electronic key 66. The emergency release key 84 is provided with a guide portion 90 for sliding the emergency release key 84 and inserting the emergency release key 84 in the electronic key 66.

FIG. 8 indicates a front face and a lateral face of the electronic key 66 with the emergency release key 84 stored therein. An upper surface of a casing 66a of the electronic key 66 is formed with a recessed portion 92 for storing the grip portion 86 of the emergency release key 84 and the magnet key 88, and is also formed with a guiding recessed portion 94 fitted around the guide portion 90. The emergency release key 84 is inserted into the casing 66a of the electronic key 66 so that the guide portion 90 is arranged along the guiding recessed portion 94. As a result, the emergency release key 84 can be stored in the casing 66a of the electronic key 66. At this time, the emergency release key 84 is inserted into the casing 66a of the electronic key 66 from a rear end side opposite to the end side with the magnet key 88 provided.

A battery 96 for the electronic key 66 is provided substantially in the center of the electronic key 66, and the emergency release key 84 functions as a cover for the battery 96 for the electronic key 66. For this reason, portability of the emergency release key 84 is improved, it is not necessary to separately provide a cover for the electronic key 66, and the number of components can be reduced. Also, an antenna 98 for the electronic key 66 is provided on a side opposite to the magnet key 88 with respect to the battery 96. The antenna 98 performs communication with the vehicle-side control unit 68 when the emergency release key 84 is stored in the electronic key 66. In this way, in a front view of the electronic key 66, the battery 96, the antenna 98, and the magnet key 88 are displaced. As a result, thickness of the electronic key 66 can be suppressed.

As shown in FIG. 2, in order to fix the ignition switch unit 40 to the vehicle body frame, a left side of the ignition switch unit 40 is formed with holes (frame fastening portions) 100a, 100b (see FIG. 2) for inserting unillustrated bolts. The holes 100a, 100b are formed in the vicinity of the handlebar locking pin 56. The hole 100a is formed in the ignition switch unit 40, and the hole 100b is formed in a boss 101 formed with respect to the ignition switch unit 40.

A spigot fitting portion 102 spigot-fitted around a periphery of the hole 100a (that is, the boss 101) is provided on a left surface of the first protective cover 52. That is, in the ignition switch unit 40, a recessed portion 104 fitted around the spigot fitting portion 102 is formed in the periphery of the hole 100a, and the spigot fitting portion 102 is spigot-fitted to the recessed portion 104 from a left side of the vehicle body toward the right side of the vehicle body. Therefore, the left surface of the first protective cover 52 is attached to the ignition switch unit 40 by the spigot fitting portion 102. For this reason, the number of components for attaching the first protective cover 52 to the ignition switch unit 40 can be reduced.

Also, as shown in FIG. 3 and FIG. 4, a right surface and an upper surface of the first protective cover 52 are fastened to the ignition switch unit 40 by screws (fastening members) 106, 108. The screw 106 fastens the right surface of the first protective cover 52 (body portion 76) to the ignition switch unit 40, the right surface being opposed to the left surface. The screw 108 fastens the upper surface of the first protective cover 52 (body portion 76) to the ignition switch unit 40 together with the first case 46.

Also, the second case 48 for supporting the lid release unit 42 is fastened to a right side of the first case 46 for supporting the ignition switch unit 40 by a screw (fastening member) 110. Hereat, after the lid release unit 42 is attached to the ignition switch unit 40, a clearance between the ignition switch unit 40 and the lid release unit 42 is narrowed, and the lid release unit 42 is provided adjacently to the screw 106. In view of this, after the lid release unit 42 is attached to the ignition switch unit 40, the right surface of the first protective cover 52 cannot be fastened to the ignition switch unit 40 by the screw 106. Therefore, when the smartlock module 22 is assembled, firstly, the first protective cover 52 is attached to the ignition switch unit 40. After that, the lid release unit 42 is attached next to the right side of the ignition switch unit 40.

When the smartlock module 22 configured as described above is attached to the motorcycle 10, as shown in FIG. 1, only some of the first case 46 and the second case 48 are exposed from an opening formed in the led shield 20 toward a side of the rider. Therefore, the ignition knob 24 and the lid opening knob 26 are brought to an operable state. On the other hand, rear sides of the ignition switch unit 40 and the lid release unit 42 are covered with the leg shield 20 and are brought to a state that cannot be visually recognized from the outside. Also, after the coupler 72 is connected to the coupler 70, the cover portion 74 for the first protective cover 52 is closed. With this arrangement, the claw portion 74a of the cover portion 74 and the locking portion 76a of the body portion 76 are engaged with each other. As a result, the cover portion 74 is kept in the closed state, and access to the lock mechanism 64 and the coupler 70 becomes impossible.

Next, a relationship of arrangement when the smartlock module 22 and the vehicle-side control unit 68 are attached to the motorcycle 10 will be described using FIG. 9. FIG. 9 is a perspective view of a front side of the motorcycle 10 in the vicinity of the head pipe 60. For the purpose of easy-to-understand explanation, FIG. 9 is drawn with members unnecessary for explanation of a front cowl or the like of the motorcycle 10 omitted. As shown in FIG. 9, a rear side of the head pipe 60 is covered with the leg shield 20.

The smartlock module 22 and the vehicle-side control unit 68 are arranged on the right side of the head pipe 60 of the motorcycle 10, and the vehicle-side control unit 68 is arranged in the vicinity of the head pipe 60 and below the smartlock module 22. In this way, the vehicle-side control unit 68 is arranged in the vicinity of the head pipe 60. Therefore, access to the vehicle-side control unit 68 can become difficult. Also, since the vehicle-side control unit 68 is arranged below the smartlock module 22, the wiring 72a (see FIG. 6) for connecting the vehicle-side control unit 68 and the ignition switch unit 40 can be shortened. Further, the vehicle-side control unit 68 and the ignition switch unit 40 can be collectively arranged, and the efficiency in layout of the whole electronic authentication system is improved.

The vehicle-side control unit 68 has a plate-like shape, and is arranged with a longitudinal direction thereof directed to a front-back direction of the vehicle. That is, the vehicle-side control unit 68 is arranged with the thickness thereof directed to a vehicle width direction. With this arrangement, the vehicle-side control unit 68 can approach the head pipe 60.

A protective cover 112 for covering the vehicle-side control unit 68 from below is fixed to the head pipe 60. In other words, a stay 114 for fixing an unillustrated headlight is attached to the head pipe 60, and the protective cover 112 is attached to the stay 114. That is, the protective cover 112 is fixed to the head pipe 60 through the stay 114. The protective cover 112 has a function of preventing detachment of the vehicle-side control unit 68 from below the vehicle body. The vehicle-side control unit 68 is arranged in the vicinity of the head pipe 60. For this reason, the protective cove 112 can be easily attached to the head pipe 60.

The vehicle-side control unit 68 is attached to the protective cover 112. As a method for attaching the vehicle-side control unit 68, for example, the protective cover 112 may be formed with a flange (drawing is omitted) that projects upward, and the vehicle-side control unit 68 may be formed with a hook (drawing is omitted) that is fitted to the flange from above. With this arrangement, the vehicle-side control unit 68 can be attached to the protective cover 112 by being hooked to the flange from above. In this case, the vehicle-side control unit 68 can be detached from the protective cover 112 by upwardly moving the vehicle-side control unit 68.

The leg shield 20 is proved with a projecting portion 116 that extends to cover the vehicle-side control unit 68 from above. The projecting portion 116 has a function of preventing detachment of the vehicle-side control unit 68 from above the vehicle body, and restricts upward movement of the vehicle-side control unit 68. Since the projecting portion 116 is integrally provided to the led shield 20, the number of components can be reduced, and the vehicle-side control unit 68 can be protected. Note that the protective cover 11 may be provided above the vehicle-side control unit 68, and the projecting portion 116 may be provided below the vehicle-side control unit 68.

The inner box 118 is arranged on the left side of the head pipe 60. The smartlock module 22 and the vehicle-side control unit 68 are collectively arranged on the right side of the head pipe 60. For this reason, a storage space for the inner box 118 can be ensured on the left side of the head pipe 60, and the inner box 118 can be enlarged. Note that the smartlock module 22 and the vehicle-side control unit 68 may be arranged on the left side of the head pipe 60, and the inner box 118 may be arranged on the right side of the head pipe 60.

Figure 10:
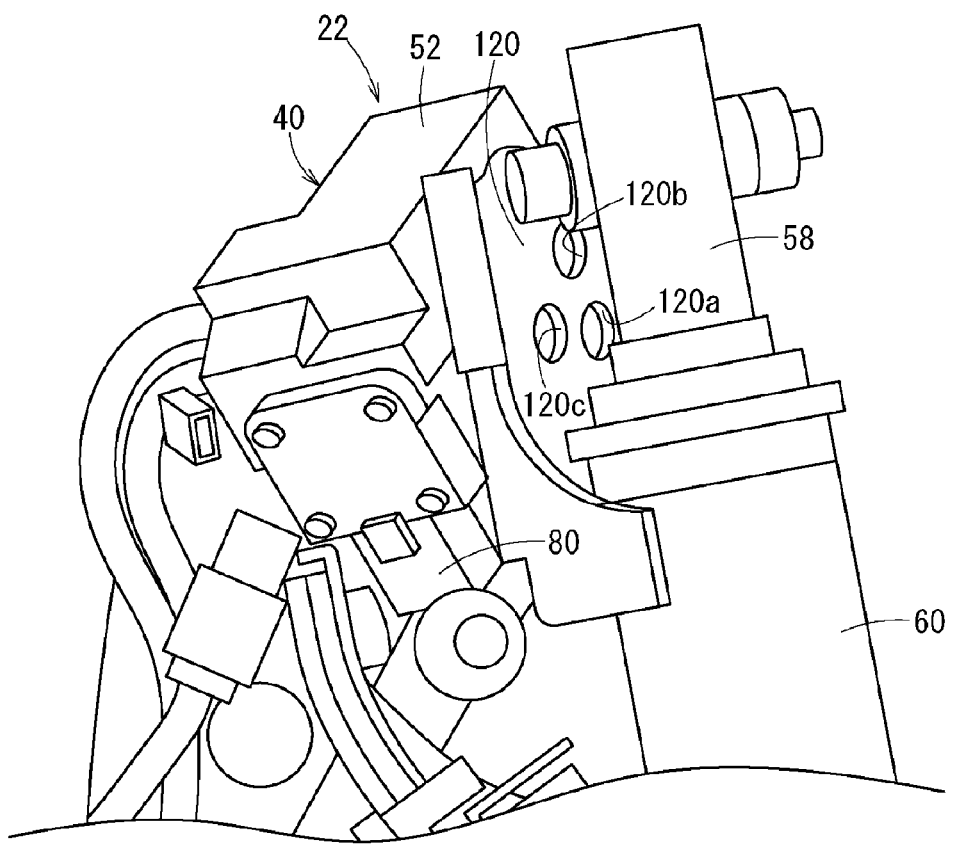
FIG. 10 is a view for explaining an attachment structure of the smartlock module to a head pipe.

Next, an attachment structure of the smartlock module 22 to the head pipe 60 will be described. As shown in FIG. 10, the smartlock module 22 is fastened to a bracket (vehicle body frame) 120 provided to the head pipe 60 as the vehicle body frame of the vehicle. In other words, when bolts (not shown) are inserted into the holes 100*a*, 100*b* opened in the ignition switch unit 40 through holes 120*a*, 120*b* formed in the bracket 120, the smartlock module 22 is fastened to the bracket 120. Therefore, a surface with the hole 100*a* opened in the ignition switch unit 40 and a surface on an end side of the boss 101 abut on the bracket 120. Also, the bracket 120 is formed with a hole 120*c* for allowing insertion of the handlebar locking pin 56 of the ignition switch unit 40. That is, when the handlebar locking pin 56 of the ignition switch unit 40 is projected with the handlebar portion 12 turned to a predetermined position, the handlebar locking pin 56 is inserted into the engaging hole opened in the steering stem 58 through the hole 120*c* opened in the bracket 120. The holes 120*a*, 120*b*, 120*c* are formed in the bracket 120 on the same plane.

In order to achieve access to the lock mechanism 64 and the coupler 70 with the smartlock module 22 provided to the bracket 120 and the cover portion 74 for the first protective cover 52 closed, the first protective cover 52 must be detached from the ignition switch unit 40. In order to detach the first protective cover 52, it is necessary to cancel spigot fitting of the ignition switch unit 40 to the spigot fitting portion 102 formed with respect to the first protective cover 52, and also to unscrew the screws 106, 108. However, as has been described above, the surface with the hole 100*a* opened in the ignition switch unit 40 and the surface on the end side of the boss 101 abut on the bracket 120. Therefore, in order to cancel the spigot fitting of the spigot fitting portion 102, the ignition switch unit 40 must be detached from the bracket 120. As a result, the spigot fitting cannot be easily canceled. Also, as shown in FIG. 4, the lid release unit 42 is arranged next to the right side of the ignition switch unit 40. Therefore, in order to unscrew the screw 106 provided on the side of the right surface of the ignition switch unit 40, the lid release unit 42 must be detached from the ignition switch unit 40. As a result, the screw 106 cannot be easily unscrewed. Therefore, the first protective cover 52 cannot be easily detached. For this reason, access to the lock mechanism 64 and the coupler 70 cannot be easily performed, and theft prevention of the vehicle can be improved.

Figure 11:
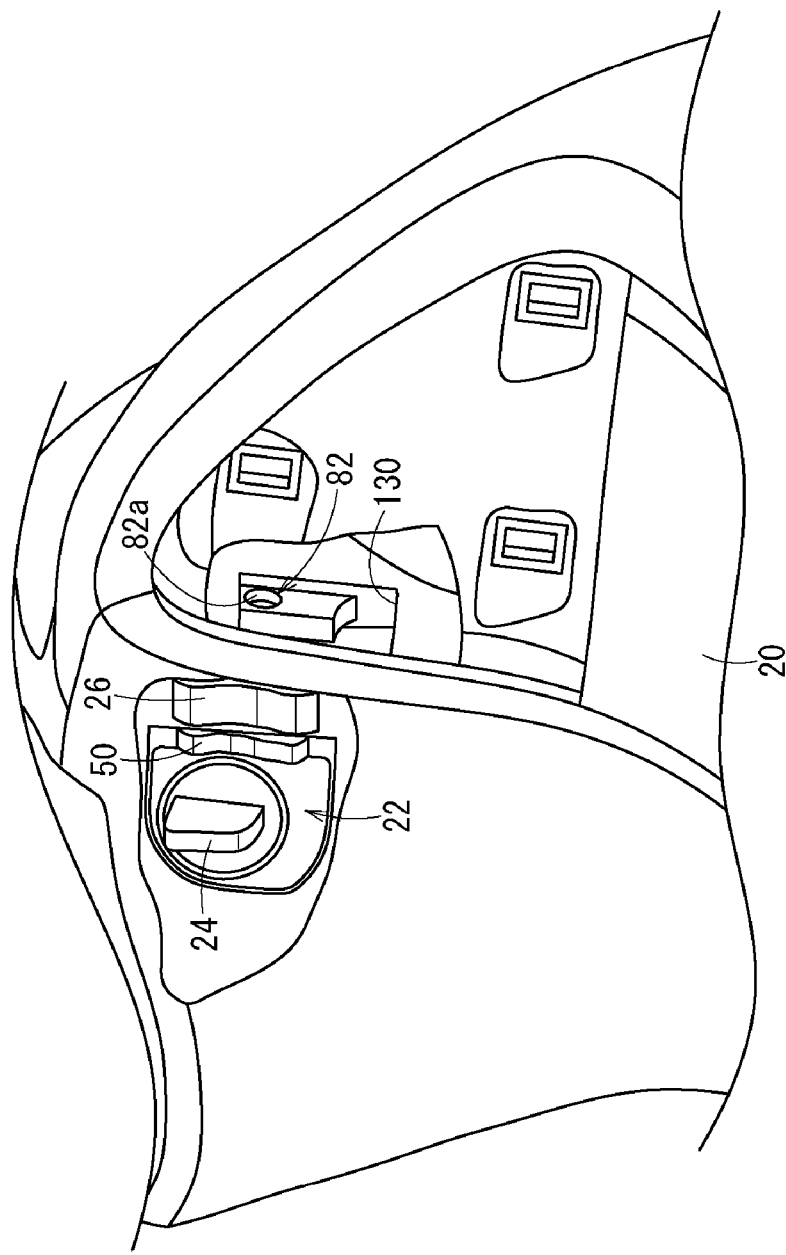
FIG. 11 is a perspective view of a substantial part of a leg shield when an emergency releasing cover is detached.

FIG. 11 is a perspective view of a substantial part of the leg shield 20 when the emergency releasing cover 30 is detached. When the emergency releasing cover 30 is detached, an insertion opening 130 formed in the leg shield 20 is exposed. The insertion opening 130 is formed to allow access of the emergency release key 84 to the keyhole 82*a* from behind the leg shield 20. By the insertion opening 130, the keyhole 82*a* formed in the key cylinder 82 covered with the leg shield 20 is exposed.

Figure 12:
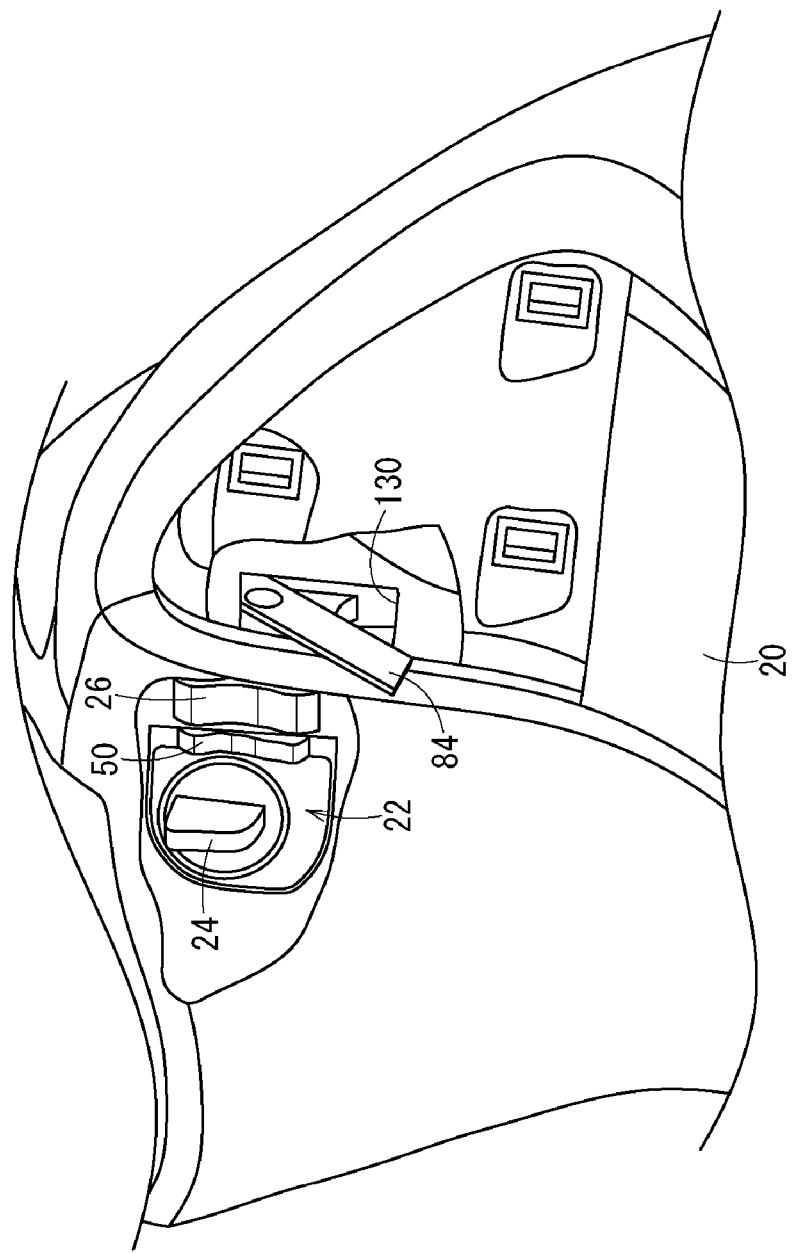
FIG. 12 is a view indicating a state when a magnet key of the emergency release key is inserted into a keyhole formed in a key cylinder, in FIG. 11.

While the grip portion 86 of the emergency release key 84 is gripped, an end side of the emergency release key 84 (a side of the magnet key 88) can be inserted into the insertion opening 130 along a substantially front-back direction (insertion direction) of the vehicle. The keyhole 82*a* is arranged in a direction opposed to the insertion direction, and detailedly in a substantially rightward direction of the vehicle body. Therefore, when the emergency release key 84 is inserted into the insertion opening 130 along the insertion direction so that the magnet key 88 is directed to a substantially leftward direction of the vehicle body, as shown in FIG. 12, the magnet key 88 can be easily inserted into the keyhole 82*a*. Also, the magnet key 88 is provided to a lateral on the end side of the grip portion 86 of the emergency release key 84, and the keyhole 82*a* is arranged in a direction opposed to the insertion direction. For this reason, a space for inserting the magnet key 88 into the keyhole 82*a* can be reduced. Although the space is narrow, access to the keyhole 82*a* can be achieved.

When the emergency release key 84 is inserted into the insertion opening 130, the keyhole 82*a* is covered with the emergency release key 84. Therefore, the keyhole 82*a* cannot be visually recognized. In view of this, the magnet key 88 must be fitted to the keyhole 82*a* with a sense so that the magnet key 88 is inserted into the keyhole 82*a*. And so, a guide portion 132 may be formed. The guide portion 132 guides the magnet key 88 of the emergency release key 84 to the keyhole 82*a* formed in the key cylinder 82.

Figure 13:
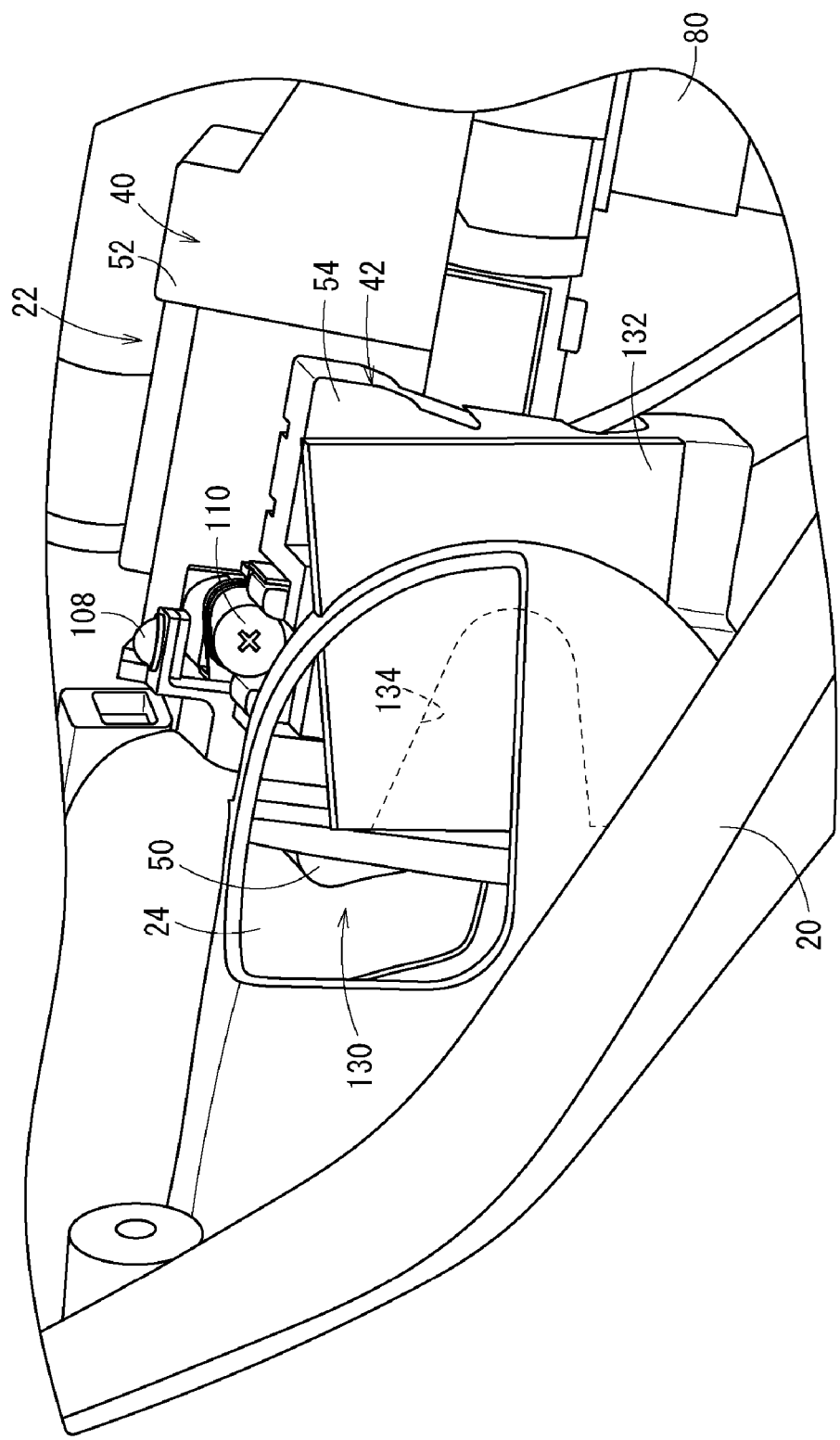
FIG. 13 is a view indicating a guide portion when viewed from a right side of a vehicle body.

FIG. 13 is a view indicating the guide portion 132 when viewed from the right side of the vehicle body. The guide portion 132 is provided on a lateral face of the key cylinder 82 on the right side of the vehicle body 2, and is integrally formed with the leg shield 20. The guide portion 132 is formed with a guide groove 134 for guiding the magnet key 88. The guide groove 134 is formed in a lateral face of the guide portion 132 with the lid release unit 42 provided.

Figure 14:
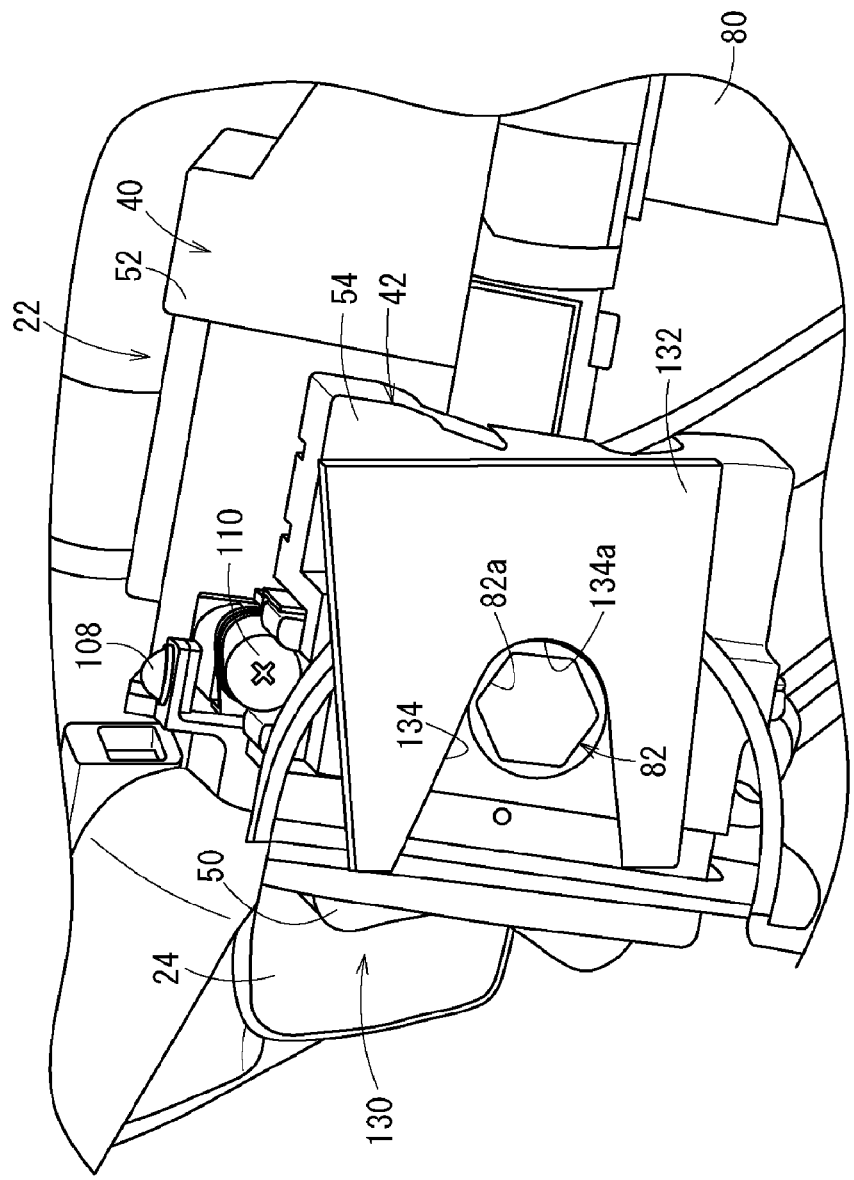
FIG. 14 is a cross-sectional view when a guide groove is cut along a surface parallel to a lateral face of the guide portion.

FIG. 14 is a cross-sectional view when the guide groove 134 is cut along a surface parallel to the lateral face of the guide portion 132. The guide groove 134 is formed in such a manner that a vertical height of the guide portion 132 is gradually lowered from a side of the insertion opening 130 toward a side of the keyhole 82*a*. When an end of the emergency release key 84 abuts on a bottom portion 134*a* of the guide groove 134 on a side of the insertion direction of the emergency release key 84, in a side view shown in FIG. 14, the magnet key 88 conforms to the keyhole 82*a*. Therefore, when the emergency release key 84 is inserted into the insertion opening 130, the end of the emergency release key 84 abuts on the bottom portion 134*a*, and the magnet key 88 is moved in the leftward direction of the vehicle body, the magnet key 88 can be easily inserted into the keyhole 82*a*.

In this way, since the guide portion 132 is formed, even if the keyhole 82*a* cannot be visually recognized, the magnet key 88 can be easily inserted in the keyhole 82*a*. Also, since the guide portion 132 is integrally formed with the leg shield 20, the number of components can be reduced.

REFERENCE SIGNS LIST

10 . . . Motorcycle
12 . . . Handlebar portion
20 . . . Leg shield
22 . . . Smartlock module
24 . . . Ignition knob
26 . . . Lid opening knob
30 . . . Emergency releasing cover
32 . . . Seat
40 . . . Ignition switch unit
42 . . . Lid release unit
52 . . . First protective cover
54 . . . Second protective cover
56 . . . Handlebar locking pin
58 . . . Steering stem
60 . . . Head pipe
64 . . . Lock mechanism
66 . . . Electronic key
66*a* . . . Casing 68 ... Vehicle-side control unit
70, 72 ... Coupler
74 ... Cover portion
76 ... Body portion
82 ... Key cylinder
82a ... Keyhole
84 ... Emergency release key
86 ... Grip portion
88 ... Magnet key
96 ... Battery
100a, 100b, 120a, 120b, 120c ... Hole
102 ... Spigot fitting portion
106, 108, 110 ... Screw
112 ... Protective cover
114 ... Stay
116 ... Projecting portion
118 ... Inner box
120 ... Bracket
130 ... Insertion opening
132 ... Guide portion
134 ... Guide groove

The invention claimed is:

1. A motorcycle, comprising:
   a vehicle-side electronic controller configured to determine whether or not identification information from an electronic key conforms to identification information on a side of a vehicle;
   an ignition switch configured to allow at least starting operation of an engine and unlocking operation of a handlebar, in accordance with a situation where the identification information from the electronic key conforms to the identification information on the side of the vehicle; and
   a wiring electrically connecting the vehicle-side controller and the ignition switch, wherein the vehicle-side electronic controller and the ignition switch are disposed on one side of a head pipe of the vehicle, and
   the vehicle-side electronic controller is disposed in a vicinity of the head pipe and straight below the ignition switch, and
   wherein the wiring length is shortened based on the vehicle-side electronic controller and the ignition switch being disposed on the one side of the head pipe, and based on the vehicle-side electronic controller being disposed straight below the ignition switch.

2. The motorcycle according to claim 1, wherein the vehicle-side electronic controller is disposed with a longitudinal direction thereof directed to a front-back direction of the vehicle.

3. The motorcycle according to claim 1, wherein an inner box is disposed on another side of the head pipe where the vehicle-side electronic controller and the ignition switch are not disposed.

4. The motorcycle according to claim 1, wherein a protective cover configured to cover one vertical side of the vehicle-side electronic controller is fixed to the head pipe.

5. The motorcycle according to claim 1, wherein a vehicle body cover of the vehicle is provided with a projecting portion that extends to cover another vertical side of the vehicle-side electronic controller and that prevents detachment of the vehicle-side electronic controller.

6. A motorcycle, comprising: vehicle-side control means for determining whether or not identification information from electronic key means conforms to identification information on a side of a vehicle;
   ignition switch means for allowing at least starting operation of an engine and unlocking operation of a handlebar, in accordance with the situation where the identification information from the electronic key means conforms to the identification information on the side of the vehicle; and
   a wiring means for electrically connecting the vehicle-side control means and the ignition switch means,
   wherein the vehicle-side control means and the ignition switch means are disposed on one side of a head pipe of the vehicle,
   wherein the vehicle-side control means is disposed in a vicinity of the head pipe and straight below the ignition switch means, and
   wherein the wiring length means is shortened based on the vehicle-side control means and the ignition switch means being disposed on the one side of the head pipe, and based on the vehicle-side control means being disposed straight below the ignition switch means.

7. The motorcycle according to claim 6, wherein the vehicle-side control means is disposed with a longitudinal direction thereof directed to a front-back direction of the vehicle.

8. The motorcycle according to claim 6, wherein an inner box is disposed on another side of the head pipe where the vehicle-side control means and the ignition switch means are not disposed.

9. The motorcycle according to claim 6, further comprising protective cover means for covering one vertical side of the vehicle-side control means, said protective cover means being fixed to the head pipe.

10. The motorcycle according to claim 6, further comprising vehicle body cover means for covering the vehicle, said vehicle body cover means including a projecting portion extending to cover another vertical side of the vehicle-side control means, and which prevents detachment of the vehicle-side control means.

* * * * *